(12) United States Patent
Longeru et al.

(10) Patent No.: US 10,794,365 B2
(45) Date of Patent: Oct. 6, 2020

(54) TOWER SEGMENT, TOWER SECTION, TOWER, WIND TURBINE, AND METHOD FOR PRODUCING A TOWER SEGMENT AND FOR CONNECTING TOWER SEGMENTS

(71) Applicant: Wobben Properties GmbH, Aurich (DE)

(72) Inventors: Markus Longeru, Stade (DE); Falko Bürkner, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/323,411

(22) PCT Filed: Aug. 3, 2017

(86) PCT No.: PCT/EP2017/069644
§ 371 (c)(1),
(2) Date: Feb. 5, 2019

(87) PCT Pub. No.: WO2018/029070
PCT Pub. Date: Feb. 15, 2018

(65) Prior Publication Data
US 2019/0170122 A1    Jun. 6, 2019

(30) Foreign Application Priority Data

Aug. 8, 2016    (DE) .................... 10 2016 114 661

(51) Int. Cl.
*F03D 13/20*    (2016.01)
*E04H 12/12*    (2006.01)
(Continued)

(52) U.S. Cl.
CPC ............. *F03D 13/20* (2016.05); *E04H 12/10* (2013.01); *E04H 12/12* (2013.01); *E04H 12/16* (2013.01);
(Continued)

(58) Field of Classification Search
CPC ......... E04H 12/16; E04H 12/342; E04H 7/20; F05B 2250/131; F05B 2250/132
(Continued)

(56) References Cited

U.S. PATENT DOCUMENTS 741,403 A * 10/1903 Hubbard ................ B65D 90/10
                                                          52/192
850,048 A *  4/1907 Playford ................... E04H 7/20
                                                          52/223.3
(Continued)

FOREIGN PATENT DOCUMENTS

CA          2759150 A1 * 10/2010 ............. E04H 12/04
CA          3044706 A1 *  5/2018 ........... E04H 12/341
(Continued)

*Primary Examiner* — Robert Canfield
(74) *Attorney, Agent, or Firm* — Seed Intellectual Property Law Group LLP (57) ABSTRACT

A tower segment of a tower of a wind turbine, a tower portion of a wind turbine, a tower of a wind turbine, a wind turbine, a method of producing a tower segment of a wind turbine and a method of connecting tower segments of a wind turbine. The tower segment includes a compression element and a tension element, wherein the tension element is arranged with its main direction of extent substantially horizontally in the installation state and is spaced from the tower segment in a direction in orthogonal relationship with its main direction of extent and is connected to the compression element by way of an intermediate element.

17 Claims, 9 Drawing Sheets

(51) Int. Cl.
  *E04H 12/16* (2006.01)
  *E04H 12/34* (2006.01)
  *E04H 12/10* (2006.01)
(52) U.S. Cl.
  CPC ...... *E04H 12/342* (2013.01); *F05B 2240/912* (2013.01); *F05B 2250/131* (2013.01); *F05B 2260/30* (2013.01); *Y02E 10/726* (2013.01); *Y02E 10/728* (2013.01)
(58) Field of Classification Search
  USPC .......................... 52/248, 584.1, 223.3, 223.5
  See application file for complete search history.

(56) References Cited

U.S. PATENT DOCUMENTS

| | | | | |
|---|---|---|---|---|
| 877,534 A * | 1/1908 | Vanvactor | ............... | F16L 9/003 138/158 |
| 965,982 A * | 8/1910 | Beal | ............... | F16L 9/003 138/158 |
| 1,086,295 A * | 2/1914 | Hillman | ............... | E04H 7/20 52/223.3 |
| 1,116,654 A * | 11/1914 | Wenzelmann | ....... | B65D 90/026 52/266 |
| 1,247,958 A * | 11/1917 | Holmes | ............... | B65D 90/026 52/266 |
| 1,491,328 A * | 4/1924 | Albin | ............... | B65D 90/08 52/246 |
| 2,074,592 A * | 3/1937 | Rowell | ............... | E04H 7/28 52/223.3 |
| 2,120,838 A * | 6/1938 | Rollie | ............... | E04H 7/28 52/271 |
| 2,501,951 A * | 3/1950 | Lintz | ............... | E04H 7/28 52/248 |
| 3,146,549 A * | 9/1964 | James | ............... | E04G 21/12 52/223.3 |
| 4,207,716 A * | 6/1980 | Moldrup | ............... | E04H 7/20 52/223.3 |
| 4,555,883 A * | 12/1985 | Agsten | ............... | E04H 7/18 52/245 |
| 8,844,237 B2 | 9/2014 | Kapitza et al. | | |
| 9,062,662 B1 | 6/2015 | Johnson et al. | | |
| 9,328,528 B2 | 5/2016 | Gregor | | |
| 9,689,175 B2 * | 6/2017 | Zavitz | ............... | E04H 12/16 |
| 2005/0166521 A1 | 8/2005 | Silber | | |
| 2008/0209842 A1 * | 9/2008 | Montaner Fraguet | .. | F03D 13/20 52/651.07 |
| 2009/0142178 A1 | 6/2009 | Nieuwenhuizen | | |
| 2010/0281818 A1 | 11/2010 | Southworth | | |
| 2012/0174522 A1 * | 7/2012 | Gregor | ............... | E04H 12/06 52/651.01 |
| 2013/0129525 A1 | 5/2013 | Pabst | | |
| 2014/0318055 A1 * | 10/2014 | Martinez De Castaneda | ............... | E04H 12/16 52/223.5 |
| 2016/0032608 A1 | 2/2016 | Betran Palomas | | |
| 2016/0201350 A1 * | 7/2016 | Zavitz | ............... | E02D 27/425 52/223.5 |

FOREIGN PATENT DOCUMENTS

| | | | | |
|---|---|---|---|---|
| CN | 102971526 A | | 3/2013 | |
| DE | 102012011175 A1 | | 12/2013 | |
| DE | 102013016604 A1 | | 4/2015 | |
| DE | 102016114661 A1 * | | 2/2018 | ............ F03D 13/20 |
| EP | 1156175 A2 | | 11/2001 | |
| JP | 2007046292 A * | | 2/2007 | ............ E04H 12/26 |
| JP | 2007321710 A * | | 12/2007 | ............ F03D 13/20 |
| RU | 2075644 c1 | | 3/1997 | |
| RU | 2550124 c2 | | 5/2015 | |
| WO | 03/083236 A1 | | 10/2003 | |
| WO | 2010/044381 A1 | | 4/2010 | |
| WO | 2011/029515 A2 | | 3/2011 | |
| WO | 2011/058158 A1 | | 5/2011 | |

* cited by examiner

TOWER SEGMENT, TOWER SECTION, TOWER, WIND TURBINE, AND METHOD FOR PRODUCING A TOWER SEGMENT AND FOR CONNECTING TOWER SEGMENTS

BACKGROUND

Technical Field

The invention concerns a tower segment of a tower of a wind turbine, a tower portion of a wind turbine, a tower of a wind turbine, a wind turbine, a method of producing a tower segment of a wind turbine and a method of connecting tower segments of a wind turbine.

Description of the Related Art

Towers of wind turbines, in particular horizontal axis wind turbines, contribute to a considerable extent to the overall costs of manufacture of a wind turbine. In particular the ever increasing rotor diameters and nominal power outputs of wind turbines have the result that the towers are also becoming larger and/or are exposed to higher loading levels. In particular manufacture and/or assembly of the towers is/are time-consuming and costly.

On the application from which priority is claimed for the present application the German Patent and Trade Mark Office searched the following state of the art: DE 10 2012 011 175 A1 and DE 10 2013 016 604 A1.

BRIEF SUMMARY

Provided is a tower segment of a tower of a wind turbine, a tower portion of a wind turbine, a tower of a wind turbine, a wind turbine, a method of producing a tower segment of a wind turbine and a method of connecting tower segments of a wind turbine which reduce or eliminate one or more disadvantages of existing solutions. Provided is a tower segment of a tower of a wind turbine, a tower portion of a wind turbine, a tower of a wind turbine, a wind turbine, a method of producing a tower segment of a wind turbine and a method of connecting tower segments of a wind turbine which simplify and/or improve and/or reduce the cost of manufacture and/or assembly of tower portions and/or towers of wind turbines.

Provided is a tower segment of a tower of a wind turbine, including a compression element and a tension element, wherein the tension element is arranged with its main direction of extent substantially horizontally in the installation state and is spaced from the tower segment in a direction in orthogonal relationship with its main direction of extent and is connected to the compression element by way of an intermediate element.

In particular, a tower segment includes a compression element and a tension element which are spaced from each other and are connected by an intermediate element.

Towers of wind turbines generally have a vertical longitudinal axis in the installation state and in the operational state and are of an annular cross-section in orthogonal relationship with that longitudinal axis. That annular cross-section can be in the form of a circular ring or can also be of a polygonal shape. In this application therefore the term annular is used to denote not only a configuration in the form of a circular ring, but also a polygonal and/or multi-sided configuration having a plurality of straight portions.

In this application terms like radial, tangential, peripheral and so forth are used in relation to the longitudinal axis of a tower and refer to any cross-sectional shapes of such a tower, in particular both to cross-sections in the form of a circular ring and also polygonal cross-sections.

A tower segment is used here as being a part of an annular tower portion, that is to say an element which extends only over a part of the periphery of the tower. An annular tower portion is preferably formed from a plurality of tower segments, wherein vertically oriented longitudinal joins can generally be provided between the tower segments in the installation state and in the operational state. A tower includes a plurality of tower portions which are arranged in vertically mutually superposed relationship in the installation state and in the operational state of the wind turbine. The term installation state is used here in particular to denote a state relating to the vertical oriented tower which—insofar as a pod with rotor which is suitably ready for operation is arranged on the tower—also corresponds to the operational state of the wind turbine. A substantially horizontal orientation of the longitudinal axis, for example in manufacture and/or in transport of the tower or parts thereof, is not intended here to be denoted by the term installation state. The orientations described in relation to the installation state are to be suitably adapted in the production and/or transport state to the longitudinal axis of the tower or a part thereof, which is temporarily not oriented vertically.

Towers of wind turbines generally taper from their lower end to their upper end. The orientation of the tower wall of a tapering tower generally differs from the vertical only by a few degrees. When in this application reference is made to orientations, in particular in the installation state, like for example up, down, radial, horizontal, vertical and so forth, that is therefore also intended to correspondingly apply to tapering towers and accordingly tower walls which are slightly inclined with respect to the vertical.

Various construction modes for towers of wind turbines are known. In particular towers which have proved successful are towers involving a massive construction, of concrete and/or reinforced concrete and/or prestressed concrete and/or steel.

Particularly by virtue of the large diameter of annular tower portions, both in the form of a circular ring and also of a polygonal shape, it is known for tower portions to be subdivided in the longitudinal direction into tower segments as the tower segments can be more easily manufactured and/or transported than annular tower portions. The tower segments generally involve a surface extent forming the tower wall and a thickness which is in orthogonal and/or radial relationship therewith, which is generally a multiple smaller than the surface extent. Tower segments for towers of polygonal cross-section are generally flat and therefore do not have any curvature in their surface extent. Tower segments for towers of a cross-section in the form of a circular ring in contrast generally have a curvature and/or a radius in their surface extent and are thus in the shape of a peripheral surface segment of a cylinder or cone or truncated cone.

The tower segment has a compression element which generally has the above-described surface extent and is of an orthogonal thickness which is smaller by a multiple in relation thereto, wherein the surface extent can be curved or flat. Arranged spaced from that compression element is a tension element which is generally of a bar-shaped configuration in which a main direction of extent is greater by a multiple than the extent in orthogonal relationship with that main direction of extent. The compression element and the tension element are connected together by way of an intermediate element. The intermediate element is oriented substantially horizontally in the installation state.

The intermediate elements can preferably be concreted with a first end into the compression elements. Further preferably the intermediate elements are fixed to the compression elements with headed bolt dowels.

The connection between the intermediate elements and the tension elements can be made on site upon assembly of the tower or can already be effected in manufacture of the tower segments, for example in a prefabricated part factory.

The tension element serves substantially to carry tensile forces, in particular in a substantially tangential direction. The compression element serves substantially to carry compression forces. The intermediate element serves substantially to carry tensile forces, in particular in a substantially radial direction. The intermediate element is preferably arranged in orthogonal relationship with the main direction of extent of the tension element and/or in orthogonal relationship with the surface extent of the compression element and/or arranged radially with respect to the longitudinal axis of the tower. Further preferably the intermediate element is oriented substantially horizontally in the installation state. Preferably a tower segment can have two, three or more intermediate elements. A tower segment can also have two, three or more tension elements, wherein the two, three or more tension elements are preferably spaced from each other in the vertical direction in the installation state.

The tension element and the compression element are spaced from each other in orthogonal relationship with the main direction of extent of the tension element, preferably in a substantially horizontal and/or substantially radial direction. Preferably the tension element is disposed on an inside of the compression element, thus in the interior of the tower in the installation state and/or operational state of the wind turbine. Further preferably the tension element is oriented with its main direction of extent substantially parallel to the surface extent of the compression element, particularly in the case of compression elements with a surface extent without curvature.

The compression element is preferably made of concrete and/or reinforced concrete and/or prestressed concrete. The tension element is preferably made of metal, in particular steel.

Preferably the tension element is adapted to be connected to tension elements of adjacent tower segments. Equally the compression element is preferably adapted to be connected to compression elements of adjacent tower segments, preferably in a butt connection.

The connections between tower segments, in particular between the compression elements of adjacent tower segments and/or tension elements of adjacent tower segments, can preferably transmit tensile and/or compression forces. In particular the connection between the compression elements of adjacent tower segments is preferably adapted to transmit compression forces. In particular the connection between the tension elements of adjacent tower segments is preferably adapted to transmit tensile forces.

In the structure the compression forces and tensile forces can be particularly efficiently distributed as a lever effect can be used by virtue of the spacing of the compression element and the tension element from each other. In addition the compression element and the tension element can also be particularly efficiently dimensioned in that way as the lever action is advantageous by virtue of the spacing. It is possible to implement a simple butt connection for the transmission of compression forces between the compression elements of adjacent tower segments as transmission of tensile forces can be effected by way of the connection of the tension elements of adjacent tower segments.

According to a preferred embodiment it is provided that the tension element has a clamping element. The tension element can be actively provided with a tensile force by virtue of the provision of a clamping element. The clamping element can preferably be in the form of a turnbuckle. Further preferably the clamping element has a plurality of screws, wherein preferably a tensile force can be applied to the tension element by tightening the screws.

In that way a prestressing effect can be exerted on the interconnected compression elements in an annular tower portion by way of the connection of the tension elements, preferably to provide a ring of tension elements.

Particularly in an annular tower portion it is possible to provide both tower segments which have a clamping element and also tower segments which do not have a clamping element. Preferably at least one tower segment is provided with a clamping element per tower portion. Further preferably tower segments with a clamping element and tower segments without a clamping element are arranged alternately in a tower portion.

It is further preferred that the intermediate element is of a pivotable nature and/or is pivotably connected to the compression element and/or to the tension element. A preferred embodiment provides that the intermediate element has two pivotably interconnected intermediate portions.

A pivotable connection is in particular a connection which is pivotable about an axis, that axis preferably being oriented substantially vertically in the installation state, wherein here, as has also already been described above, an orientation of that axis in particular parallel to a possibly tapering tower wall is also included.

By way of such a pivotable connection the intermediate element is preferably connected to the compression element and/or to the tension element. Further preferably intermediate portions of the intermediate element itself can also be connected by such a pivotable connection.

The advantage of such a pivotable connection of the intermediate element is that in that way it can be easily and efficiently made possible for substantially tensile forces to be transmitted by the intermediate elements and tension elements and substantially compressive forces by the compression elements. The pivotable connection reduces or prevents the transmission of forces other than tensile forces by the intermediate element and/or the tension element. In addition it is possible in that way to ensure that a uniform distribution of force is achieved in a tower portion having a plurality of interconnected tower segments. In particular a biasing force applied by the clamping element can be uniformly distributed over the tension elements in that way and in that fashion can also provide for corresponding uniform prestressing of the compression elements.

A preferred development is distinguished in that the compression element has at least one lateral surface which is arranged and adapted in the installation state to form a butt connection with a lateral surface of a further tower segment.

The lateral surface of the compression element in the installation state is generally disposed in a substantially vertical plane. A mostly vertical longitudinal join is generally formed between the lateral surfaces of adjacent tower segments.

Preferably the lateral surface is adapted and—in particular in the installation state and in the operational state—arranged to form a butt connection to a further lateral surface of a further tower segment. The term butt connection is used here in particular to denote a connection which can transmit compressive forces and is made by the two lateral surfaces of two tower segments butting flat against each other.

When the butt connection is subjected to pressure, in particular by the prestressing of the tension elements, preferably a force-locking connection and/or a frictional connection is produced. The coefficient of friction between two concrete surfaces is generally about 0.5-1.

It is further preferred that the compression element has two lateral surfaces which are arranged inclinedly relative to each other.

Preferably the two lateral surfaces of a compression element are oriented not only in a respective vertical plane but are also radially oriented. That affords an inclination of the two lateral surfaces relative to each other. This has inter alia advantages in terms of assembly engineering as, by virtue of that inclination of the lateral surfaces relative to each other, a tower segment can be easily introduced into an intermediate space between two adjacent tower segments and positioned there. In addition that configuration is preferred for implementing the butt connection and for making the force-locking connection and/or the frictional connection.

According to a preferred embodiment it is provided that the intermediate element is connected to the compression element and/or the tension element and/or the intermediate portions of an intermediate element are connected with connecting elements, wherein the connecting elements are preferably of a maintenance-free and/or fail-safe nature.

The tower segments are preferably of a substantially maintenance-free and/or substantially fail-safe nature. For that purpose it is particularly preferred that the connections between the intermediate element and the tension element and/or the compression element enjoy those properties. For that purpose it is also preferred that—if the intermediate element has two or more intermediate portions—those intermediate portions and the connections thereof are also of a correspondingly maintenance-free and/or fail-safe nature. Therefore it is particular preferred that the connecting elements used for making those connections are maintenance-free and/or fail-safe. The connecting elements can preferably be in the form of nuts with cotter pins.

In a further preferred embodiment it is provided that the compression element has one, two or more positioning elements at a connecting surface which is an upper surface in the installation state and/or at a connecting surface which is a lower surface in the installation state.

The positioning elements can be for example in the form of projections and/or recesses, like for example pins or spikes and/or sleeves. Further preferably the positioning elements are so arranged and adapted that they correspond to and/or can come into engagement with corresponding positioning elements of adjacent tower segments, being in particular adjacent in a direction which is substantially vertical in the installation state.

The provision of such positioning elements can serve for centering and/or orienting and/or temporarily stabilizing tower segments, in particular upon assembly thereof and in particular as long as the tension elements of a tower portion are not yet connected together.

A further preferred development is distinguished in that the tower segment has two intermediate elements, the spacing from each other in the main direction of extent of the tension element is a multiple of the spacing thereof in relation to the lateral surfaces of the compression element.

This embodiment provides a configuration in which the intermediate elements are arranged substantially in edge regions of the tower segment, in particular at the end regions of the tension element and/or at end regions, in particular in the peripheral direction, of the compression element. In a tower portion which is composed of such tower segments therefore the intermediate elements are disposed substantially in the region of the longitudinal joins between the tower segments, and in the case of a tower of polygonal cross-section therefore substantially in the region of the corners.

It is further preferably provided that the spacing between the tension element and the compression element is at a maximum 50% of a radius of a tower, in particular a tower of which part is the tower segment. In the case of a tapering tower that detail preferably relates to the radius at the height of the tower, in which the tower segment is disposed. The radius of the tower can relate to the inside radius or the outside radius or an average value. Preferably the spacing between the tension element and the compression element is at a maximum 25%, in particular at least or at a maximum 10% of the radius.

Preferably the pressing force in the longitudinal joins between the compression elements is greater than the tensile stress in the tension elements. While the pressing force in the longitudinal joins for a configuration with angles between the compression elements, which are close to 180° (which would correspond to a tower shape with infinitely many corners), would be identical to the tensile force, the pressing force in the longitudinal joins increases with a decreasing number of corners down to twice the tensile force with a minimum of three corners.

It is further preferred that, in the case of a design configuration of the tower segments for a tower with more than four corners, the substantially radial tensile forces occurring in a tower portion made up from such tower segments in the intermediate elements are less than the tensile prestressing in the tension elements. In a configuration of the tower segments for a tower having four corners the tensile forces in the intermediate elements, that are substantially radial and occur in a tower portion made up from such tower segments, preferably correspond to the tensile prestressing in the tension elements. In a configuration of the tower segments for a tower with three corners the substantially radial tensile forces in the intermediate elements, that occur in a tower portion made up from such tower segments, are preferably greater than the tensile prestressing in the tension elements.

According to a further aspect of the invention provided is a tower portion of a wind turbine, including two, three or more above-described tower segments, the tension elements of which are connected together and the compression elements of which are connected by way of a butt connection.

The butt connection is preferably made between mutually facing side surfaces of adjacent tower segments. The connection between the tension elements of adjacent tower segments is preferably pivotably movable, in particular being pivotable about a substantially vertical axis. Further preferably that connection is made by way of a tensile connector which for example is pivotably connected at its respective ends to a respective one of the two adjacent tension elements.

According to a preferred embodiment of the tower portion it is provided that the upper connecting surfaces of the compression elements are disposed in different planes and/or the lower connecting surfaces of the compression elements are disposed in different planes.

That configuration has the advantage that there are no peripherally extending horizontal joins but the horizontal joins between tower segments which are arranged in vertically mutually superposed relationship in the installation state and/or the operational state, along the peripheral direction of the tower, are arranged in vertically mutually displaced relationship.

According to a further aspect of the invention provided is a tower of a wind turbine, including at least one above-described tower portion and/or at least one above-described tower segment.

According to a further aspect of the invention provided is a wind turbine, including at least one above-described tower and/or at least one above-described tower portion and/or at least one above-described tower segment.

According to a further aspect of the invention provided is a method of producing a tower segment of a wind turbine, in particular an above-described tower segment, including providing a compression element, providing a tension element, connecting the tension element to the compression element by way of an intermediate element, wherein the tension element is arranged with its main direction of extent substantially horizontally in the installation state and is spaced from the tower segment in a direction in orthogonal relationship with its main direction of extent.

According to a further aspect of the invention provided is a method of connecting tower segments of a wind turbine, including: providing two above-described tower segments, connecting the compression elements of the two tower segments by a butt connection, and connecting the tension elements of the two tower segments.

The connection of the tower segments to each other and in particular the compression elements to each other and/or the tension elements to each other is preferably first effected on site upon erection of the tower. In that way the individual tower segments can be more easily transported.

The connection is preferably made by the introduction of connecting means into suitable openings and/or recesses on the elements to be connected.

According to a preferred embodiment of the method of connecting tower segments of a wind turbine it is provided that one, two or more tower segments have a clamping element and those clamping elements are tightened, for example by tightening screws.

The methods according to the invention and the possible developments thereof have features or method steps which make them particularly suitable for being used for a tower segment according to the invention and its possible developments and/or a tower portion according to the invention and its possible developments.

In regard to the advantages, variants in the implementation and details of implementation of those further aspects of the invention and their possible developments reference is also made to the preceding description in relation to the corresponding features of the tower segments.

BRIEF DESCRIPTION OF THE SEVERAL VIEWS OF THE DRAWINGS

Preferred embodiments of the invention are described by way of example with reference to the accompanying drawings in which.

DETAILED DESCRIPTION

Figure 1:
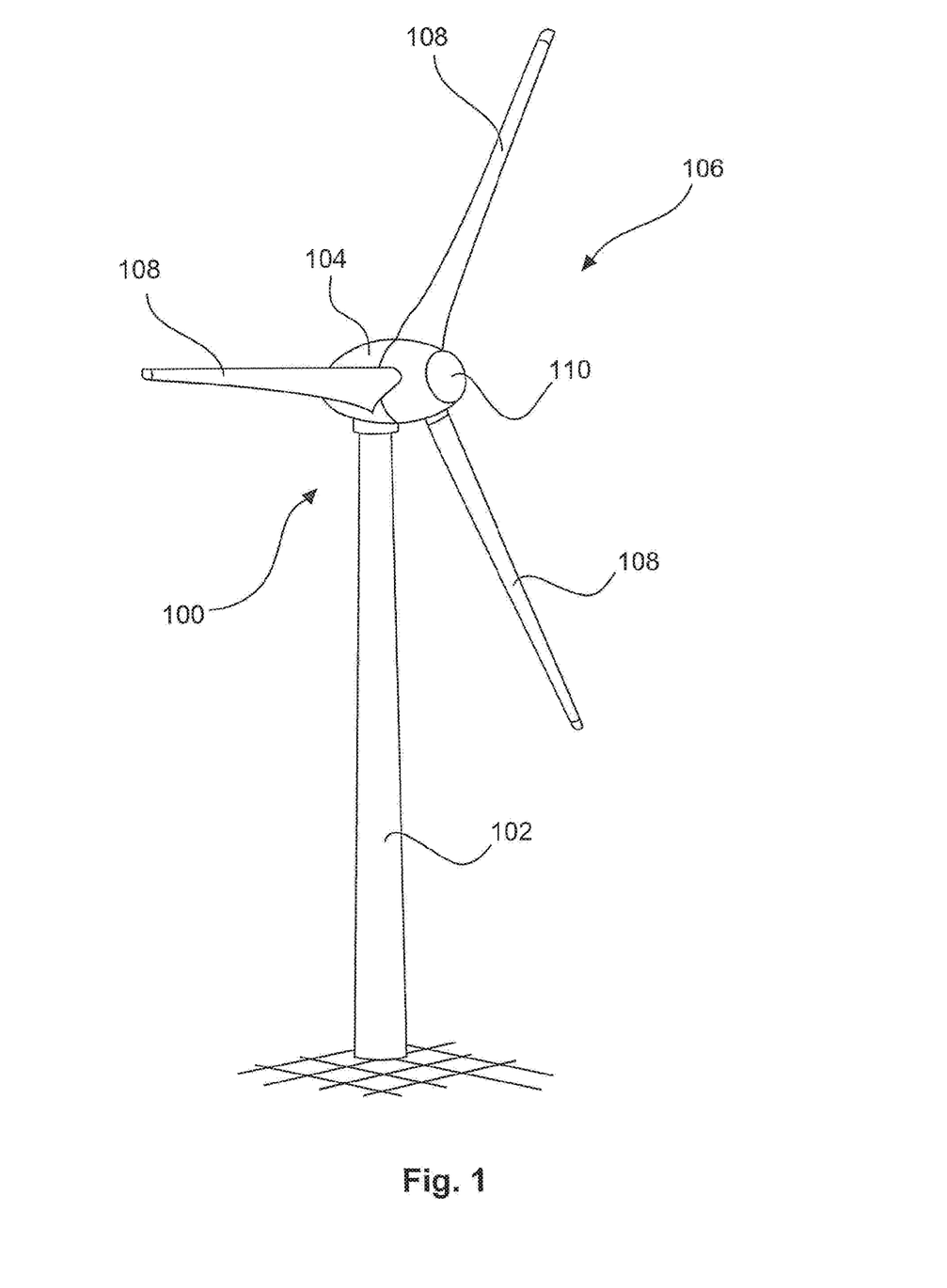
FIG. 1 shows a three-dimensional view of a wind turbine having a tower and a pod.

FIG. 1 shows a wind turbine 100 comprising a tower 102 and a pod 104. A rotor 106 having three rotor blades 108 and a spinner 110 is arranged at the pod 104. In operation the rotor 106 is caused to rotate by the wind and thereby drives a generator in the pod 104. The tower 102 shown in FIG. 1 is of a cross-section in the form of a circular ring. The tower 102 can have tower segments according to the invention, wherein the tower segments shown here in the further Figures for a tower of polygonal cross-section would have to be appropriately modified from a flat configuration of the compression elements to a curved configuration.

Figure 2:
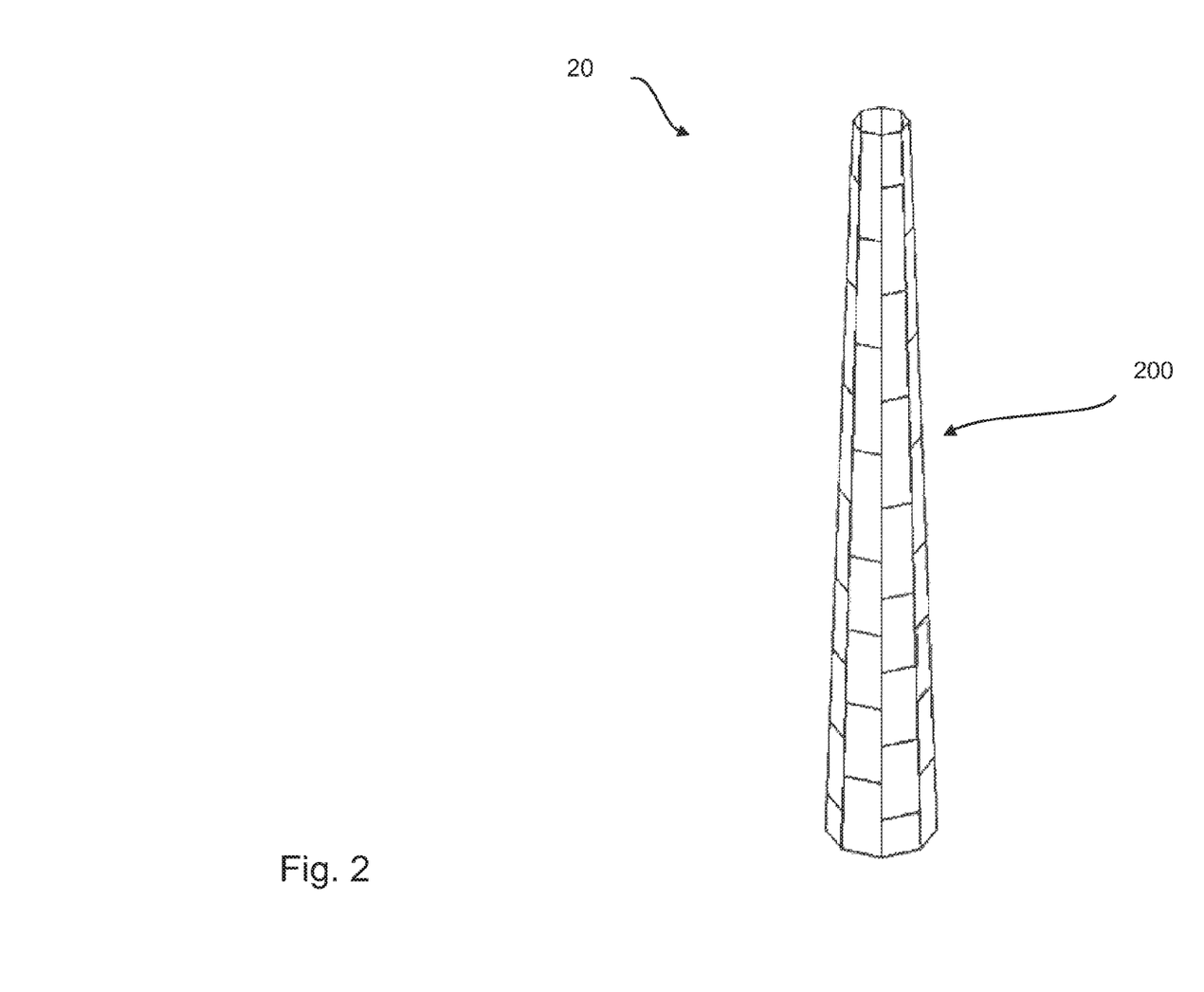
FIG. 2 shows a three-dimensional view of a tower for a wind turbine of polygonal cross-section.

FIG. 2 shows a tower 20 for a wind turbine, wherein the tower 20 has a vertical longitudinal axis and a polygonal cross-section in orthogonal relationship with that longitudinal axis. The tower 20 includes a multiplicity of tower segments 200, the surface extent of which is flat, without curvature or radius, thus affording a polygonal tower shape which here is octagonal. A typical height for a tower of a wind turbine is for example 150 mm. The tower can be made up substantially completely from tower segments as described herein. However it is also possible for only a part, preferably a lower part of the tower, for example up to a height of 75 m, to be constructed from tower segments as described herein, and for a further, preferably upper, part of the tower to be for example in the form of a steel tower.

Figure 3:
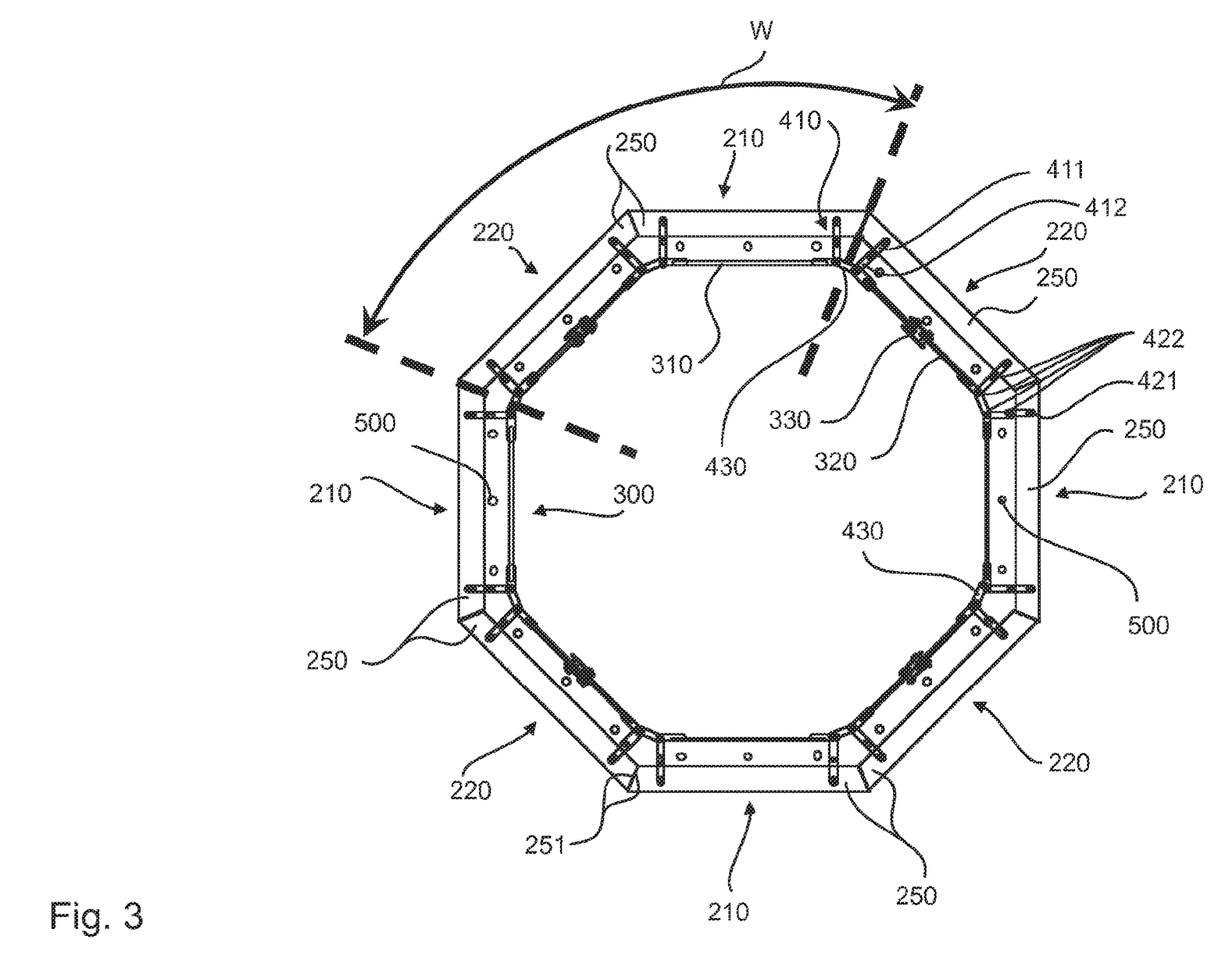
FIG. 3 shows a horizontal section through the tower of FIG. 2.
Figure 4:
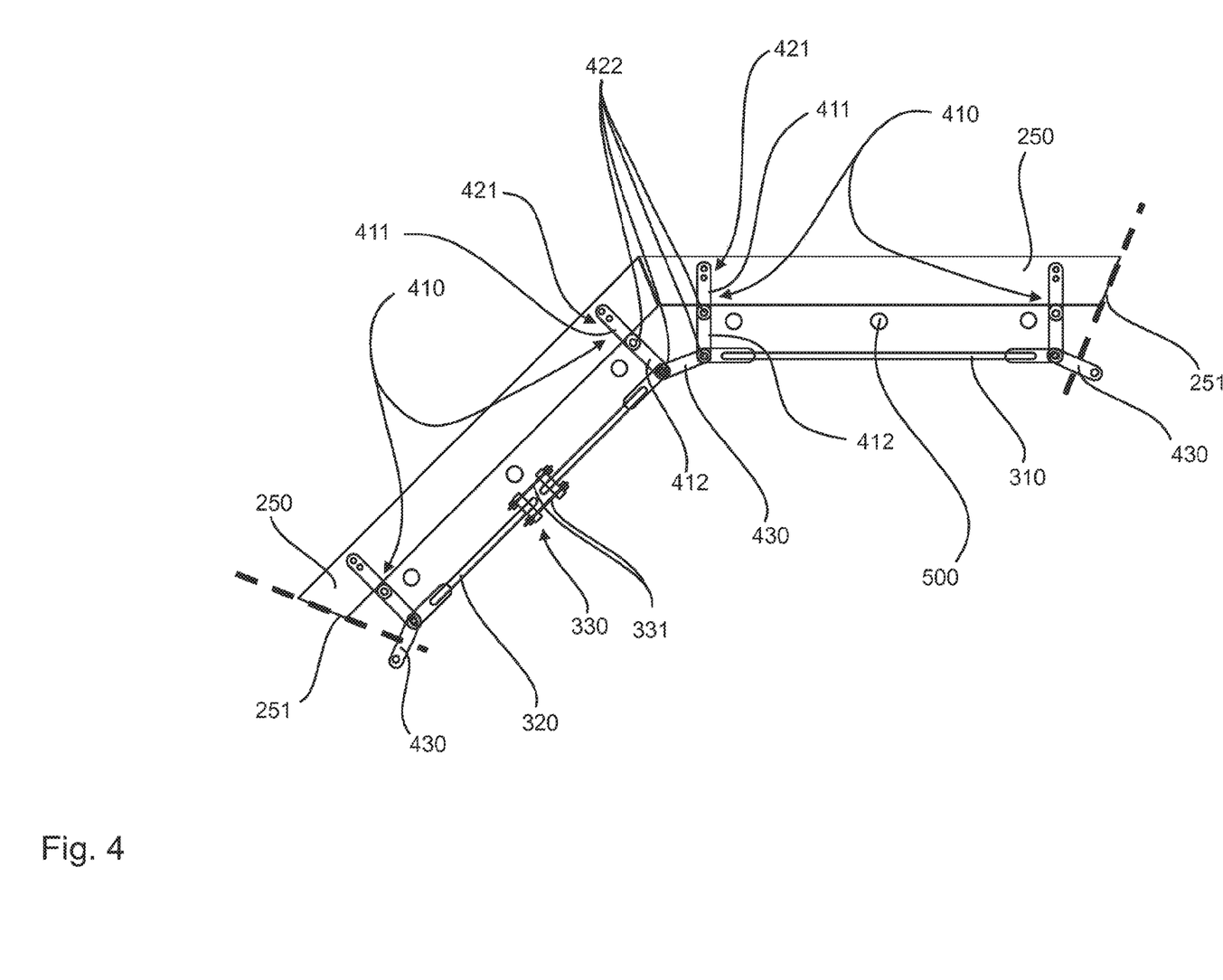
FIG. 4 shows an enlarged view of a 90° cut-out portion of FIG. 3.
Figure 5:
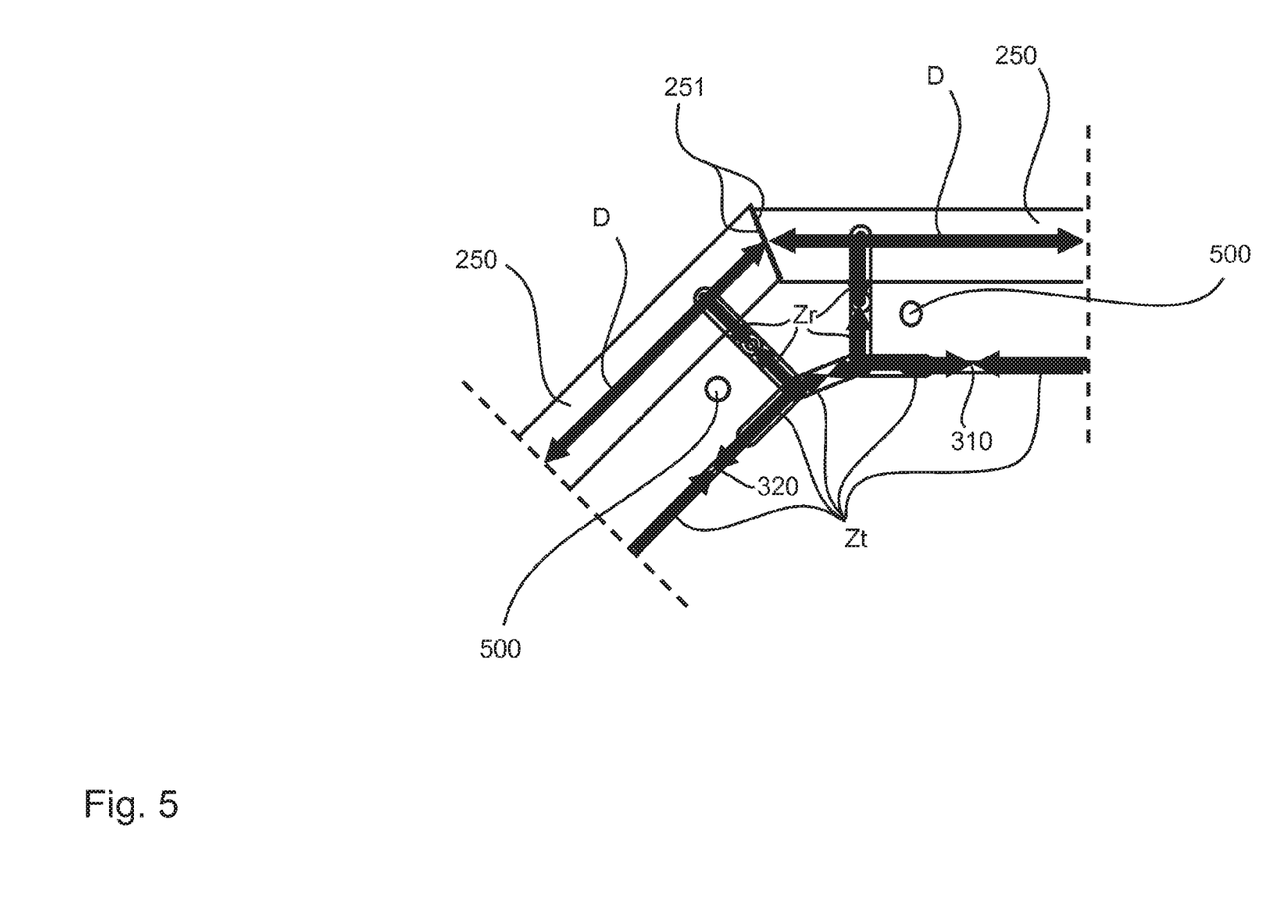
FIG. 5 shows an enlarged view of a corner as shown in FIG. 4 with the flow of forces illustrated therein.

FIG. 3 shows a horizontal section through the tower of FIG. 2. FIG. 4 shows an enlarged portion of the 90° cut-out portion identified by W in FIG. 3. FIG. 5 in turn shows a corner as illustrated in FIG. 4 on a still further enlarged scale, with the flow of forces illustrated therein, wherein D denotes the double-headed arrow for compression forces and Zt, Zr denote the double-headed arrows for tensile forces in tangential and radial directions.

As can be seen in particular from FIGS. 3 to 5 two kinds of tower segments are used. On the one hand tower segments 210 with a compression element 250 and a tension element 310 and on the other hand tower segments 220 which, besides the compression element 250, have a tension element 320 with a tightening or clamping element 330. The clamping element 330 is in the form of a turnbuckle with a plurality of clamping screws 331 so that the tension element ring 300 can be acted upon with a clamping force and thus prestressed, by tightening the clamping screws 331.

The compression elements 250 are spaced from the tension elements 310, 320 in the radial direction relative to the longitudinal axis of the tower and thus here also substantially in a horizontal direction. In this example the spacing between the compression elements 250 and the tension elements 310, 320 approximately corresponds to the thickness of the compression elements 250 in a direction in orthogonal relationship with their flat surface extent. The tension elements 310, 320 are arranged on the insides of the compression elements 250 and thus are disposed in the interior of the tower in the installation state and in the operational state of the wind turbine.

The tension elements 310, 320 are pivotably connected to the compression elements 250 by way of intermediate elements 410. The intermediate elements 410 have a first intermediate portion 411 connected to the compression element 250 by way of headed bolt dowels 421. Preferably the first ends of the first intermediate portions 411 are concreted into the compression elements 250 with the headed bolt dowels 421. Pivotably connected to the first intermediate portion 411 is a second intermediate portion 412 which in turn is pivotably connected to an end of the tension elements 310, 320. The tension elements 310, 320 of adjacent tower segments 210, 220 are pivotably connected together by way of tensile connectors 430. The pivotable connections which in particular permit pivotability of the elements connected together by way thereof about a substantially vertical axis are embodied by connecting elements 422, preferably in the form of nuts with cotter pins. In particular a configuration of the connections between the tensile elements 310, 320, the intermediate elements 410 and the compression elements 250 in maintenance-free and fail-safe form is preferred.

Each of the tower segments 210, 220 has two intermediate elements 410, the mutual spacing of which in the main direction of extent of the respective tension elements 310, 320 is a multiple of the spacing thereof relative to the lateral surfaces 251 of the compression elements 250. The lateral surfaces 251 of adjacent tower segments 210, 220 form a butt connection. The two lateral surfaces 251 of each compression element 250 are oriented in vertical planes and also oriented in the radial direction. The two lateral surfaces 251 of each compression element 210, 220 are thus inclined relative to each other.

As can be seen in particular in FIG. 5 the tension elements 310, 320 and the connecting elements 410 are substantially acted upon by tensile forces Zt, Zr. In contrast the compression elements 250 are substantially acted upon by compressive forces D. The tensile prestressing applied by the clamping elements 330 to the tension elements 320 and from there to the entire tensile element ring 300 causes a corresponding prestressing in the compression elements 250. By virtue of the spacing of the tension elements 310, 320 from the compression elements 250 and the lever effect resulting therefrom it can be provided that the compressive prestressing D in the compression elements 250 is greater and thus leads to a secure butt connection by way of frictional connection at the respectively adjacent lateral surfaces 251, than the tensile prestressing Zt in the tension elements 310, 320. In addition the substantially radially acting tensile force Zr in the connecting elements 410 can also be reduced, preferably to a value less than the tensile prestressing Zt in the tension elements 310, 320, in particular to a value less than half the tensile prestressing Zt in the tension elements 310, 320.

Arranged in the intermediate space between the compression elements 250 and the tension elements 310, 320 are vertically extending stressing cables 500 which prestress the tower in a vertical direction.

Preferably the number of clamping elements 330 in a tension element ring 300 is as low as possible, for example there may be only one clamping element 330. That facilitates assembly and in particular results in a shorter amount of time being required for assembly, for example if the clamping elements are tightened by hand. It is also possible to use preferably electric hand tools for tightening the clamping elements, for example impact wrenches or torque wrenches.

Figure 6:
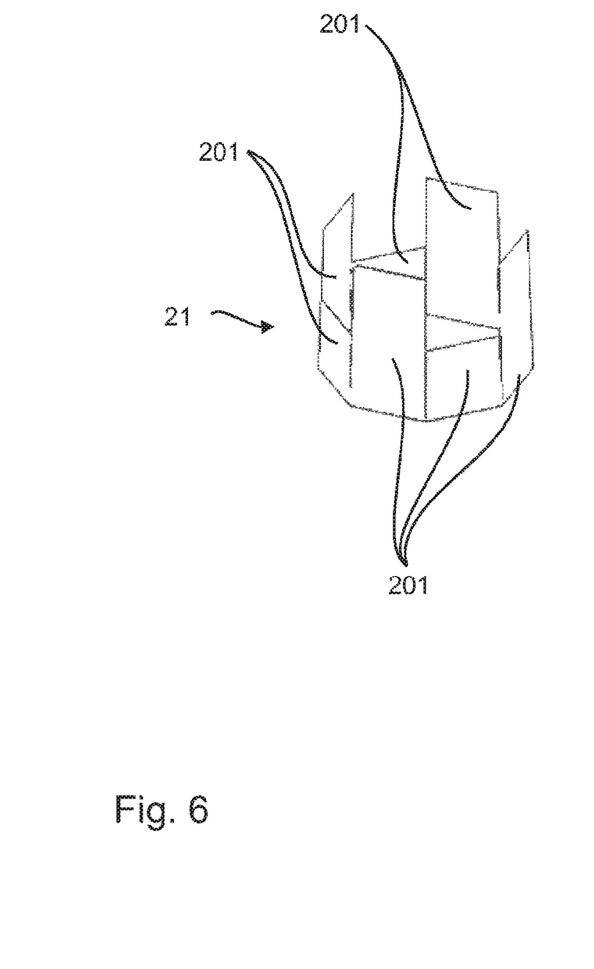
FIG. 6 shows a three-dimensional view of a tower portion with a first plane of tower segments.
Figure 7:
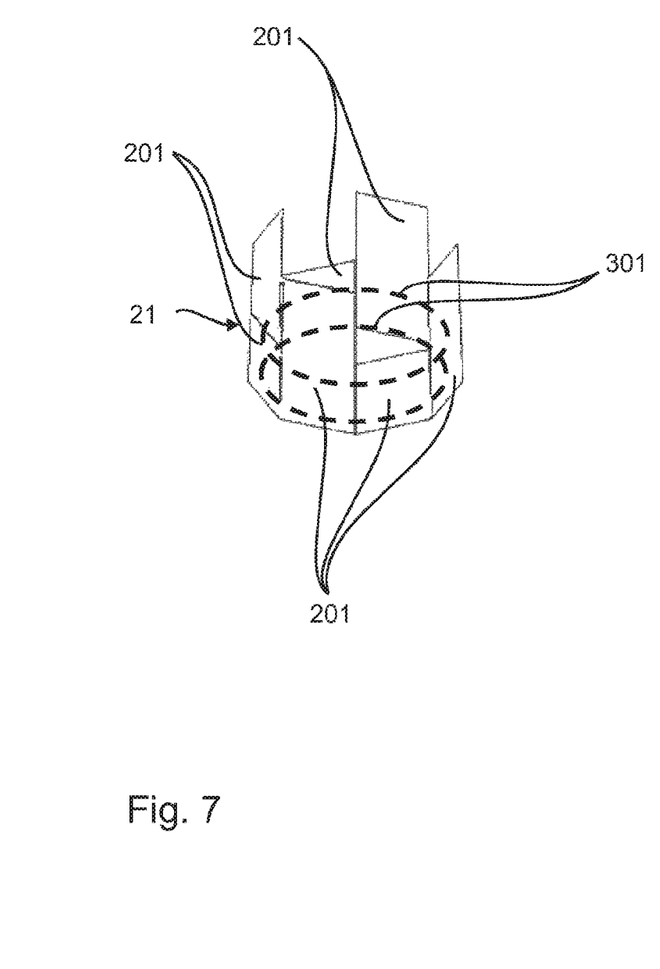
FIG. 7 shows a tower portion as shown in FIG. 6 with two first tension element rings.

FIGS. 6 to 9 diagrammatically show assembly of tower portions 21, 22. FIG. 6 firstly shows a tower portion 21 with tower segments 201 in a first plane. As can be seen the upper connecting surfaces 252 of the tower segments 201 are disposed in different planes. FIG. 7 shows the tower portion 21 with two tension element rings 301 indicated by broken circles.

Figure 8:
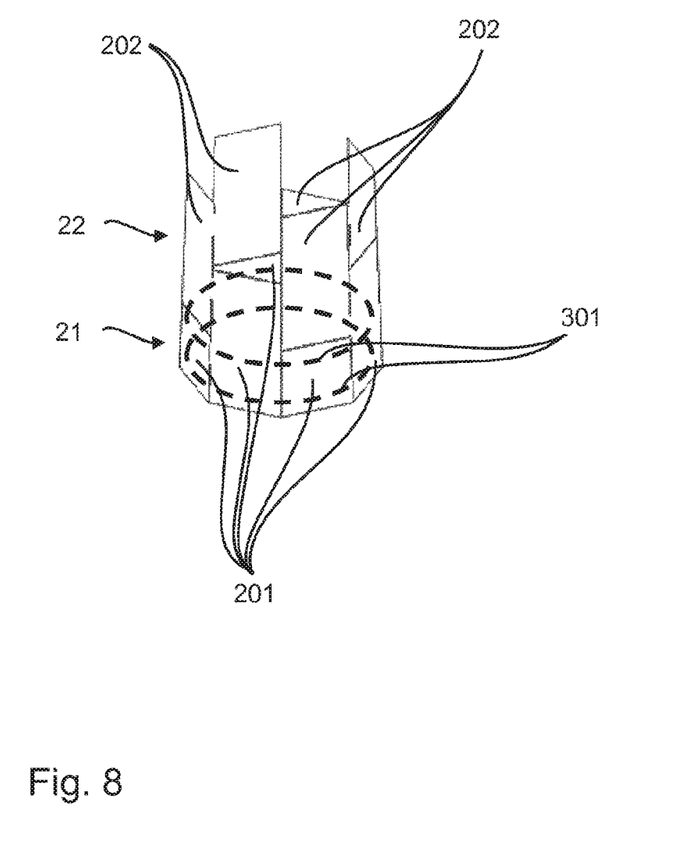
FIG. 8 shows the tower portion of FIG. 7 with a second plane of tower segments.
Figure 9:
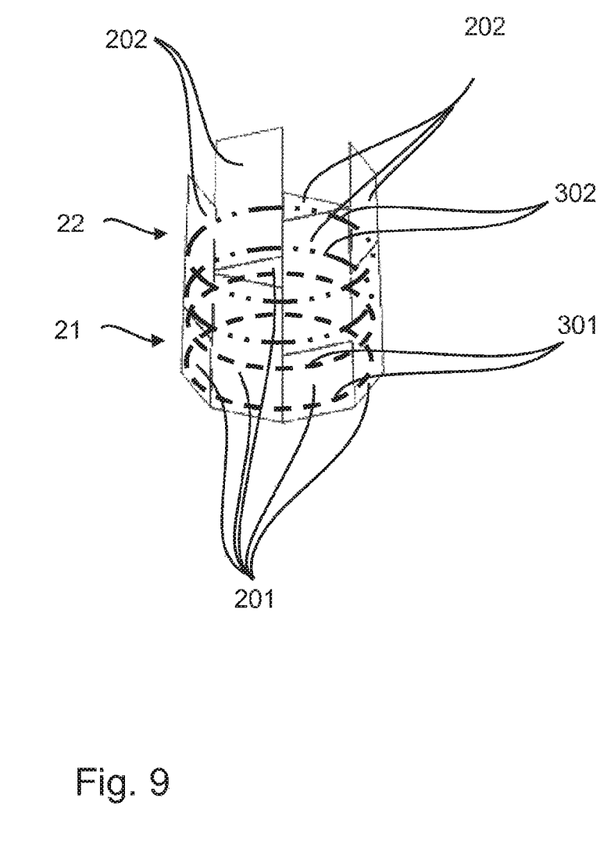
FIG. 9 shows the tower portion of FIG. 8 with two second tension element rings.

After the tower segments 201 in the first plane have been prestressed in that way, as shown in FIG. 8 the tower segments 202 in the second plane, that is to say a second tower portion 22, can be arranged on the upper connecting surfaces of the tower segments 201 in the first plane, that is to say the first tower portion 21. The upper and lower connecting surfaces of the tower segments 202 in the second plane are also disposed in different planes. As indicated in FIG. 9 by the dash-dotted circles the tower segments 202 in the second plane, that is to say the second tower portion 22, are also prestressed with tension element rings 302. In that way a multiplicity of tower portions can be arranged in mutually superposed relationship up to a desired tower height.

The tension element rings 301, 302 can be of a polygonal configuration or in the form of a circular ring.

Figure 10:
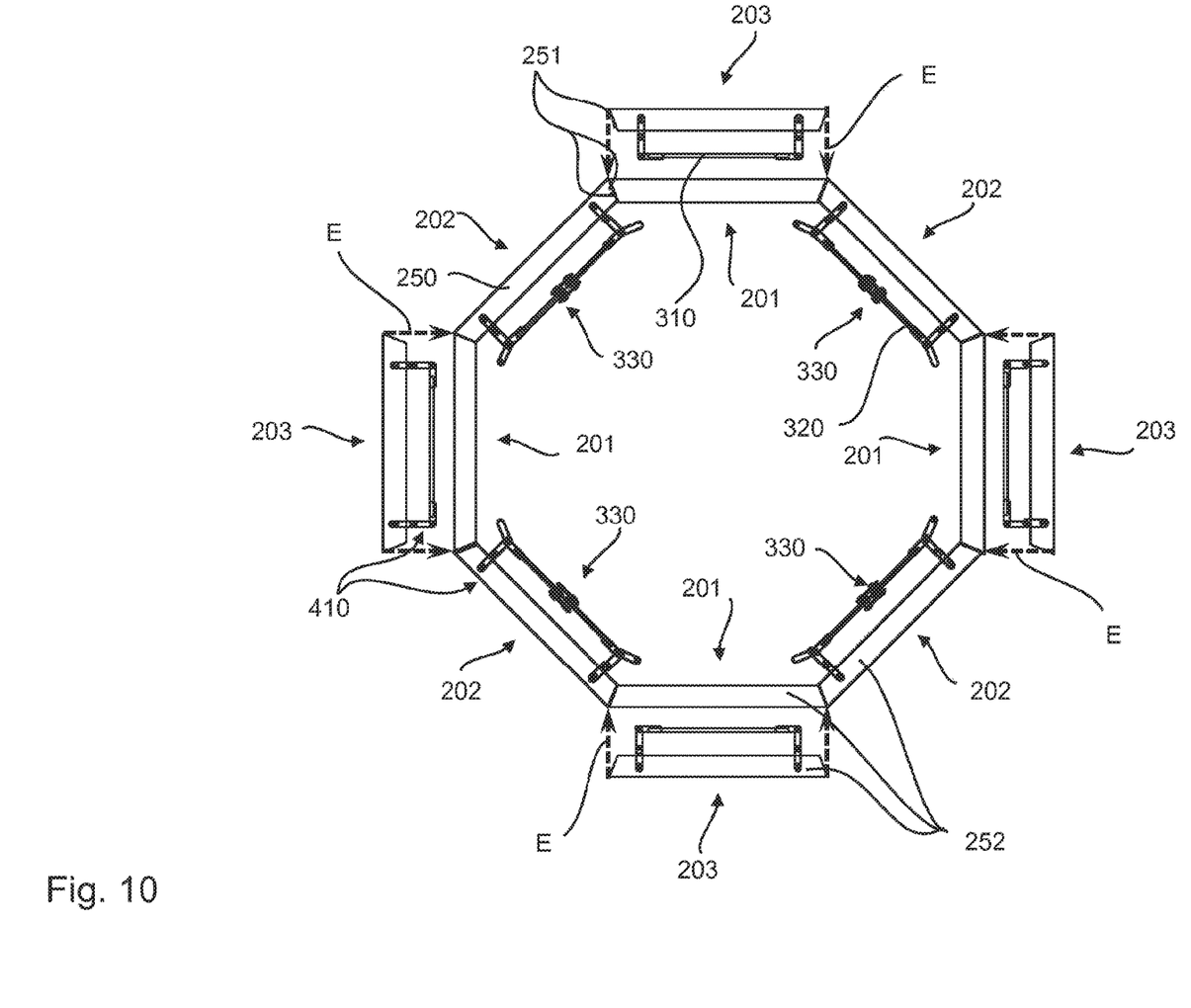
FIG. 10 shows a plan view of a tower in the assembly state with a first and a second plane of tower segments and a third plane of tower segments, which is not yet fitted in place.
Figure 11:
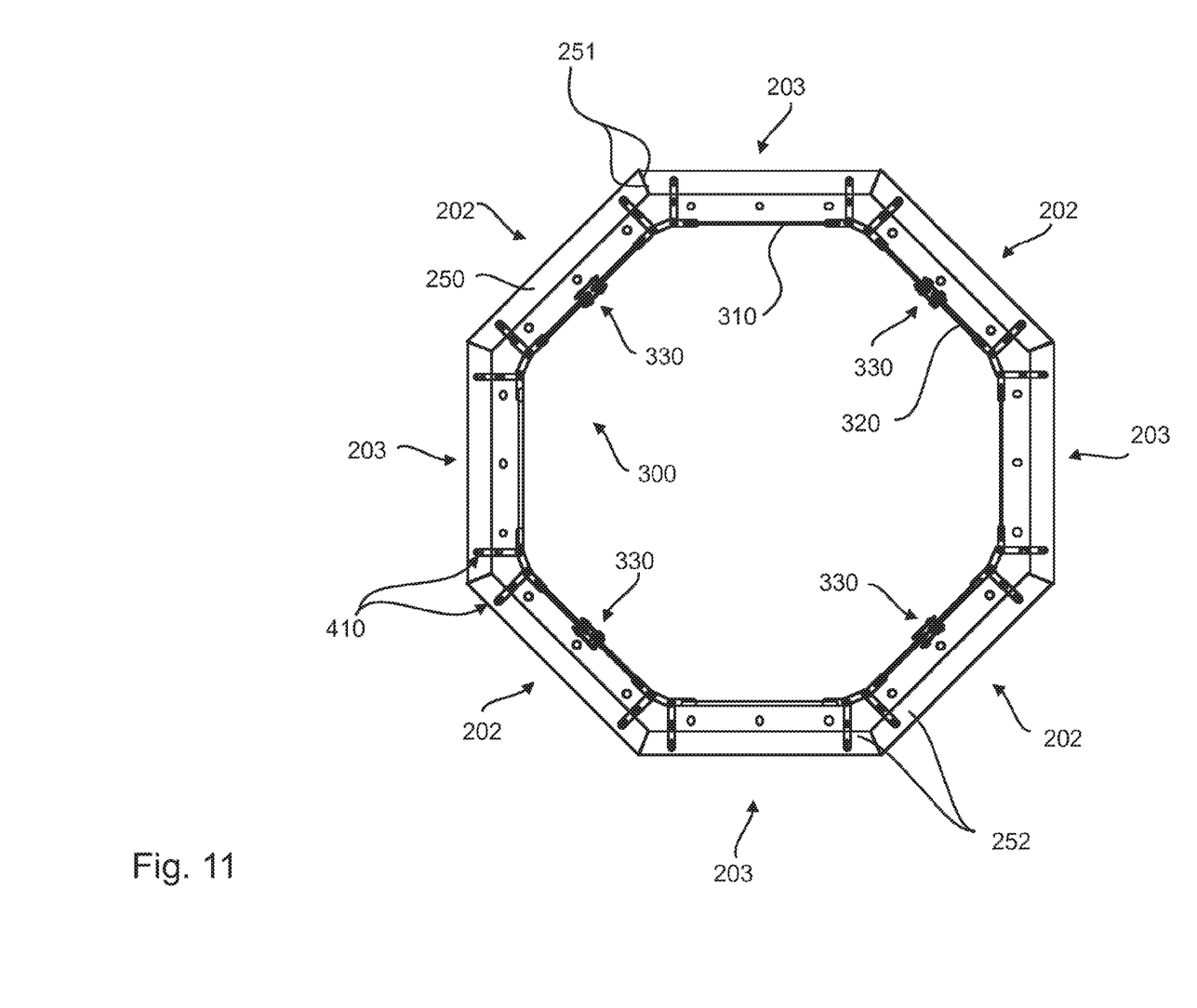
FIG. 11 shows the tower of FIG. 10 with the third plane of tower segments fitted in place.

FIG. 10 shows a plan view of a tower in the assembly state with a first and a second plane of tower segments 201, 202 and a third plane of tower segments 203, that has not yet been fitted in place. In FIG. 11 the third plane of tower segments 203 has then been fitted in place.

FIG. 10 does not show the tension elements of the tower segments 201 in the first plane. The tower segments 202 in the second plane have tension elements 320 with clamping elements 330. The tower segments 203 in the first plane have tension elements 310 without clamping elements. Preferably the tension elements 310, 320 are already fixed to the compression elements 250 of the tower segments 202, 20 before the assembly operation, as can be seen in FIG. 10 in particular at the tower segments 203 which have not yet been fitted in position.

By virtue of the mutually inclined lateral surfaces 251 of the tower segments 201, 202 and 203, upon assembly the tower segments 201, 202, 203 can be introduced in an insertion direction E into an intermediate space between two adjacent tower segments. FIG. 11 shows the tower segments 203 which are then in the assembled state, in which the tower segments 203 are fitted into the intermediate spaces between adjacent tower segments in the second plane 202 and the ring of tension elements 300 is closed.

The tower segments described here have inter alia the advantage that they permit a substantially deformation-free and force-locking connection in respect of the compression elements, and also keep the radial tensile forces low. In particular the pivotable connection permits more uniform prestressing in the elements of a tower portion so that one clamping element per tower portion may already be sufficient.

The invention claimed is:

1. A tower segment of a tower of a wind turbine, the tower segment comprising:
    a compression element; and
    a tension element coupled to the compression element by an intermediate element, wherein the tension element has a longitudinal length arranged substantially horizontally in an installation state and is spaced from an inner surface of the compression element in a direction that is orthogonal to the longitudinal length, the tension element having a clamping element configured to hold the tension element in tension.

2. The tower segment according to claim 1 wherein the compression element has at least one lateral surface arranged and adapted in the installation state to abut a lateral surface of an adjacent tower segment.

3. The tower segment according to claim 1 wherein the compression element has two lateral surfaces that are inclined relative to each other.

4. The tower segment according to claim 1 wherein the intermediate element is connected to the compression element, the tension element, or both by a plurality of connecting elements.

5. The tower segment according to claim 1, wherein the tension element is coupled to the compression element by two intermediate elements, wherein a spacing between the two intermediate elements in the longitudinal length of the tension element is a multiple of a spacing between a respective one of the two intermediate elements and a closest lateral surface of the compression element.

6. The tower segment according to claim 1 wherein the spacing between the tension element and the compression element is at a maximum 50% of a radius of a tower.

7. The tower segment according to claim 6, wherein the spacing between the tension element and the compression element is at a maximum 25% of a radius of a tower.

8. A tower portion of a wind turbine comprising a plurality of tower segments according to claim 1, wherein the tension elements of adjacent tower segments are connected together, and the compression elements of adjacent tower segments abut one another.

9. The tower portion according to claim 8 wherein upper connecting surfaces of the compression elements are in different planes than lower connecting surfaces of the compression elements.

10. A tower of a wind turbine comprising at least one tower portion according to claim 8.

11. A wind turbine comprising the tower according to claim 10.

12. A method of connecting tower segments of a wind turbine, including:
providing two tower segments according to claim 1;
abutting the compression elements of the two tower segments; and
connecting the tension elements of the two tower segments.

13. The tower segment according to claim 1, wherein the compression element has a plurality of positioning elements.

14. The tower segment according to claim 1, wherein the intermediate element is pivotable.

15. A tower segment of a tower of a wind turbine, the tower segment comprising:
a compression element; and
a tension element coupled to the compression element by an intermediate element, wherein the tension element has a longitudinal length arranged substantially horizontally in an installation state and is spaced from a surface of the compression element in a direction that is orthogonal to the longitudinal length, wherein the intermediate element is of a pivotable configuration.

16. The tower segment according to claim 15, wherein the intermediate element is pivotably connected to the compression element, the tension element or both.

17. A method of producing a tower segment of a wind turbine, the method comprising:
providing a compression element;
providing a tension element having a clamping element; and
connecting the tension element to the compression element using an intermediate element, wherein the tension element has a longitudinal length that extends substantially horizontally in an installation state and is spaced from an inner surface of the compression element in a direction that is orthogonal to the longitudinal length, wherein the clamping element is configured to hold the tension element in tension.

* * * * *

UNITED STATES PATENT AND TRADEMARK OFFICE
CERTIFICATE OF CORRECTION

PATENT NO. : 10,794,365 B2  
APPLICATION NO. : 16/323411  
DATED : October 6, 2020  
INVENTOR(S) : Markus Longeru et al.

Page 1 of 1

It is certified that error appears in the above-identified patent and that said Letters Patent is hereby corrected as shown below:

On the Title Page

Page 2, Column 2, Line 27, (56) References Cited/Foreign Patent Documents:
"WO 2010/044381 A1 4/2010" should read: --WO 2010/044380 A1 4/2010--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*